United States Patent
Taylor et al.

(10) Patent No.: US 11,312,460 B2
(45) Date of Patent: Apr. 26, 2022

(54) SYSTEM AND METHOD FOR CONTROLLING TRIM POSITION OF MARINE DRIVES ON A MULTI-HULL MARINE VESSEL

(71) Applicant: Brunswick Corporation, Mettawa, IL (US)

(72) Inventors: Brad E. Taylor, Stillwater, OK (US); David W. Dochterman, Van Dyne, WI (US); Bret A. Martin, Wellington, FL (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 17/036,888

(22) Filed: Sep. 29, 2020

(65) Prior Publication Data
US 2022/0097815 A1 Mar. 31, 2022

(51) Int. Cl.
*B63H 20/10* (2006.01)
*B63H 20/12* (2006.01)
*G05D 1/02* (2020.01)
*B63H 21/21* (2006.01)
*B63H 20/00* (2006.01)

(52) U.S. Cl.
CPC .......... *B63H 20/10* (2013.01); *B63H 20/12* (2013.01); *B63H 21/21* (2013.01); *G05D 1/0208* (2013.01); *B63H 2020/003* (2013.01); *B63H 2021/216* (2013.01)

(58) Field of Classification Search
CPC ........ B63H 20/10; B63H 20/12; B63H 21/21; B63H 2020/003; B63H 2021/216; G05D 1/0208
See application file for complete search history.

(56) References Cited

U.S. PATENT DOCUMENTS

| | | | |
|---|---|---|---|
| 9,278,740 B1 | 3/2016 | Andrasko et al. | |
| 9,493,222 B1 * | 11/2016 | Chapman | B63B 35/34 |
| 9,751,605 B1 | 9/2017 | Anschuetz et al. | |
| 9,862,471 B1 | 1/2018 | Taylor et al. | |
| 9,919,781 B1 | 3/2018 | Andrasko et al. | |
| 10,011,339 B2 | 7/2018 | Anschuetz | |
| 10,137,971 B2 | 11/2018 | Andrasko et al. | |
| 2007/0118263 A1 * | 5/2007 | Nelson | A01B 69/008 |
| | | | 701/41 |
| 2007/0276563 A1 | 11/2007 | Kaji | |
| 2009/0159360 A1 * | 6/2009 | Kasten | B62D 5/065 |
| | | | 180/422 |
| 2011/0217886 A1 | 9/2011 | Kuriyagawa et al. | |
| 2016/0200414 A1 | 7/2016 | Watts et al. | |
| 2018/0050779 A1 | 2/2018 | Anschuetz | |
| 2020/0108902 A1 * | 4/2020 | Wong | B63B 21/243 |

OTHER PUBLICATIONS

Extended European Search Report issued in Corresponding European Patent Application No. 21199624.4, dated Feb. 22, 2022.

* cited by examiner

*Primary Examiner* — Stephen P Avila
(74) *Attorney, Agent, or Firm* — Andrus Intellectual Property Law, LLP (57) ABSTRACT

A method of controlling a plurality of marine drives on a multi-hull marine vessel includes determining, based on steering information, that the multi-hull marine vessel is entering a turn and then receiving a running trim position for each marine drive. A trim position of at least a portion of the plurality of marine drives is then adjusted from each respective running trim position so as to induce roll of the multi-hull marine vessel during the turn.

21 Claims, 6 Drawing Sheets

SYSTEM AND METHOD FOR CONTROLLING TRIM POSITION OF MARINE DRIVES ON A MULTI-HULL MARINE VESSEL

FIELD

The present disclosure generally relates to systems and methods for controlling trim position of trimmable marine drives, and more particularly to methods and systems of controlling trim position of a plurality of marine drives on a multi-hull marine vessel so as to induce roll of the multi-hull marine vessel during a turn.

BACKGROUND

The following U.S. Patents and Applications provide background information and are incorporated herein by reference, in entirety.

U.S. Pat. No. 9,278,740 discloses a system for controlling an attitude of a marine vessel having first and second trim tabs and a controller having vessel roll and pitch control sections. The pitch control section compares an actual vessel pitch angle to a predetermined desired vessel pitch angle and outputs a deployment setpoint that is calculated to achieve the desired pitch angle. The roll control section compares an actual vessel roll angle to a predetermined desired vessel roll angle, and outputs a desired differential between the first and second deployments that is calculated to maintain the vessel at the desired vessel roll angle. When the controller determines that the magnitude of a requested vessel turn is greater than a first predetermined threshold, the controller decreases the desired differential between the first and second deployments, and accounts for the decreased desired differential deployment in its calculation of the first and second deployments.

U.S. Pat. No. 9,751,605 discloses a method for controlling a trim system on a marine vessel that includes receiving an actual trim position of a trimmable marine device at a controller and determining a trim position error by comparing the actual trim position to a target trim position with the controller. The method also includes determining an acceleration rate of the marine vessel. In response to determining that the trim position error exceeds a first error threshold and the magnitude of the acceleration rate exceeds a given rate threshold, the controller commands the marine device to the target trim position. In response to determining that the trim position error exceeds the first error threshold and the acceleration rate does not exceed the given rate threshold, the controller commands the marine device to a setpoint trim position that is different from the target trim position. An associated system is also disclosed.

U.S. Pat. No. 9,862,471 discloses a controller that carries out a method for positioning multiple trimmable marine propulsion devices on a marine vessel transom. The method includes identifying two propulsion devices located one on either side of a transom centerline and defining these as outer propulsion devices. A third propulsion device coupled to the transom between the outer propulsion devices is defined as an inner propulsion device. A user input is received to trim the outer and inner propulsion devices in a single direction with respect to their current trim angles. In response to the user input, the controller outputs a control signal. In response to the control signal, the outer propulsion devices are trimmed in the single direction to a first trim angle and the inner propulsion device is trimmed in the single direction to a second, different trim angle. The controller may rate limit trimming of the outer propulsion devices to accomplish this.

U.S. Pat. No. 9,919,781 discloses systems and methods that control position of a trimmable drive unit with respect to a marine vessel. A controller determines a target trim position as a function of vessel or engine speed. An actual trim position is measured and compared to the target trim position. The controller sends a control signal to a trim actuator to trim the drive unit toward the target trim position if the actual trim position is not equal to the target trim position and if at least one of the following is true: a defined dwell time has elapsed since a previous control signal was sent to the trim actuator to trim the drive unit; a given number of previous control signals has not been exceeded in an attempt to achieve the target trim position; and a difference between the target trim position and the actual trim position is outside of a given deadband.

U.S. Pat. No. 10,011,339 discloses a method of controlling trim position of two or more propulsion devices on a marine vessel that includes receiving a running trim position for the two or more propulsion devices and receiving at least one of a steering input value or a roll angle of the marine vessel. An adjusted trim position for each of the at least two propulsion devices is then determined based on the running trim position and the steering input value or the roll angle of the marine vessel. A trim actuator for each propulsion device is then operated to move each propulsion device toward its respective adjusted trim position.

U.S. Pat. No. 10,137,971 discloses a trim control system that automatically controls trim angle of a marine propulsion device with respect to a vessel. A memory stores trim base profiles, each defining a unique relationship between vessel speed and trim angle. An input device allows selection of a base profile to specify an aggressiveness of trim angle versus vessel speed, and then optionally to further refine the aggressiveness. A controller then determines a setpoint trim angle based on a measured vessel speed. If the user has not chosen to refine the aggressiveness, the controller determines the setpoint trim angle from the selected base profile. However, if the user has chosen to refine the aggressiveness, the controller determines the setpoint trim angle from a trim sub-profile, which defines a variant of the relationship between vessel speed and trim angle defined by the selected base profile. The control system positions the propulsion device at the setpoint trim angle.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a method of controlling a plurality of marine drives on a multi-hull marine vessel includes determining, based on steering information, that the multi-hull marine vessel is entering a turn and then receiving a running trim position for each marine drive. A trim position of at least a portion of the plurality of marine drives is then adjusted from each respective running trim position so as to induce roll of the multi-hull marine vessel during the turn.

In one embodiment, a system for controlling trim position of plurality of marine drives includes a plurality of trim actuators, wherein at least one trim actuator is provided for each of the plurality of marine drives. A controller is configured to receive steering information and determine, based on the steering information, that the multi-hull marine vessel is entering a turn. The controller is further configured to determine a turn direction and identify at least one outer drive to the turn and at least one inner drive to the turn based on the turn direction. A running trim position is received for each marine drive and the controller controls the plurality of trim actuators to trim down the at least one outer drive to the turn and to trim up the at least one inner drive to the turn so as to induce roll of the multi-hull marine vessel during the turn. In one embodiment, the plurality of marine drives are each adjusted by a calibrated trim change magnitude so as to mimic an effect of mounting the plurality of marine drives at canted angles on the multi-hull marine vessel.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Turning behavior of multi-hull vessels—such as catamarans, trimarans, twin hulls (e.g., Twin Vees), or the like—is different than for mono-hull vessels. Namely, multi-hull vessels tend to roll outward during a turn rather than rolling inward like mono-hull vessels. This outward roll behavior of multi-hull vessels is generally undesirable from an operator and passenger satisfaction and handling standpoint. Some multi-hull boat builders have mounted the drives at canted angles, where the top of the drives (such as outboards) tilt toward the vessel centerline and the propellers move away from the vessel centerline. This can result in inducing a desired roll of the marine vessel during a turn by drawing the inner side to the turn downward and pushing the outer side of the marine vessel to the turn upward.

Figure 1A:
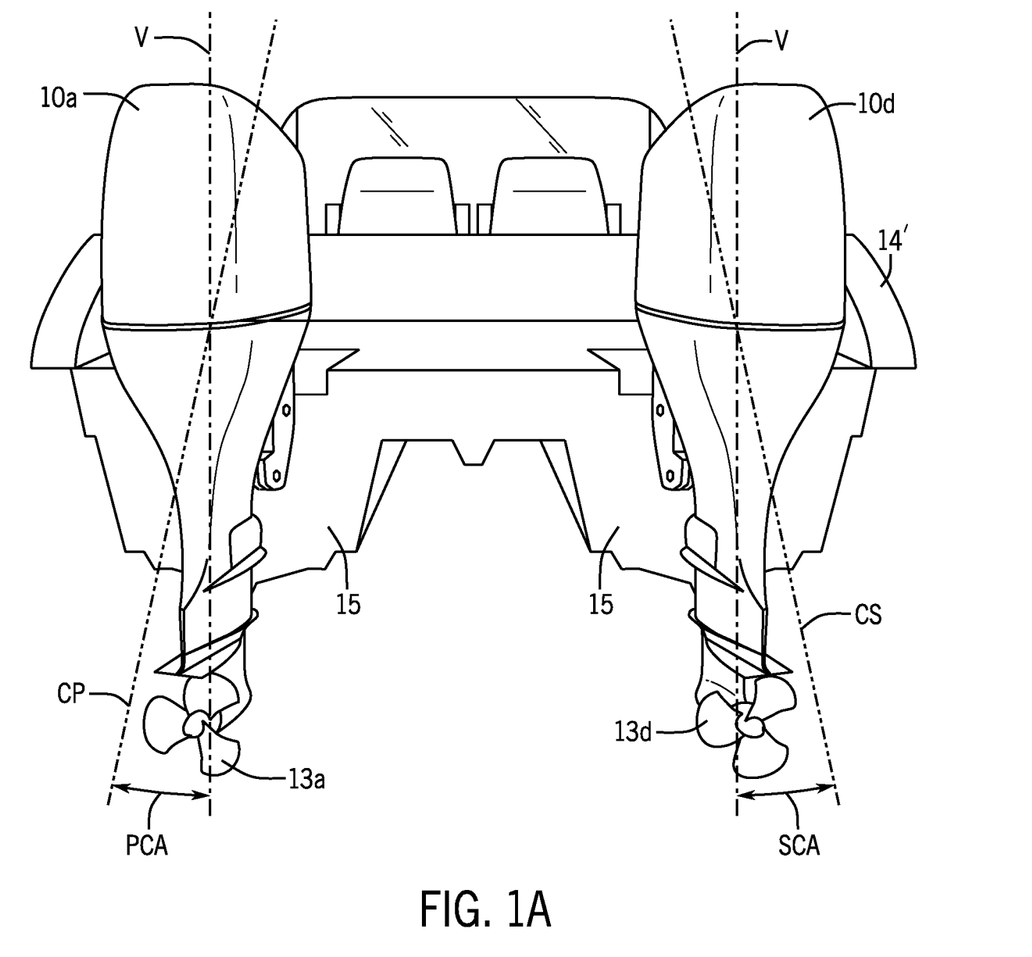
FIG. 1A is a schematic illustration of a dual-hull marine vessel with two marine drives mounted vertically thereon, and also illustrating mounting the marine drives at opposing canted angles.

FIG. 1A illustrates a multi-hull vessel 14' with two outboard drives 10a and 10d mounted thereto, one aligned with each of the two hulls 15 of the twin hull vessel. In FIG. 1A, the marine drive 10a and 10d are shown mounted in a vertical orientation, such that the centerline of each drive aligns with the vertical axis V through each drive. If the marine drives 10a and 10d were to be mounted at canted angles, the centerline of each of the marine drives 10a and 10d would each be tilted at opposite angles from one another such that the tops of the drives 10a, 10d are tilted inward toward one another and the propellers 13a and 13d are splayed outward away from one another. In the example, the port drive 10a on the port side 11 would be moved into alignment with the port cant axis CP such that the port drive would be tilted at the cant angle PCA. Similarly, starboard drive 10d on the starboard side 12 would be moved into alignment with the starboard side cant axis CS so as to be angled at the starboard cant angle SCA. This provides more desirable turning behavior.

However, the inventors have recognized that mounting marine drives at canted angles is undesirable for numerous reasons. For example, maintaining the drives long term at canted angles may cause issues with the oil pump and/or other fluid maintenance issues. Additionally, mounting and maintaining the drives 10a, 10d at canted angles is hard on the mounts and on the steering and trim systems and can cause undesirable wear effects on those systems over time.

Accordingly, the inventors have recognized a need for a propulsion system and method that offers improved turn control for multi-hull vessels without requiring that the drives be mounted at canted angles. As disclosed herein, the inventors have developed a trim control system and method for multi-hull vessels wherein variable trim control is utilized to mimic the effect of mounting the marine drives at canted angles. Namely, the trim position of the two or more marine drives 10a, 10d is variably adjusted during a turn so as to induce a desirable inward roll of the multi-hull marine vessel during a turn. The outer drive to a turn is trimmed down to drive the outer hull upward and the inner drive to the turn is trimmed up to pull the inner hull to the turn downward. Thus, the multi-hull vessel 14, such as the twin-hull 14' shown in FIG. 1, is forced to roll inward during the turn, similar to the natural behavior of a mono-hull vessel. This inward roll is more comfortable for drivers and passengers, is easier to handle for the driver, and is generally considered desirable turn behavior for a vessel.

Those skilled in the art of marine vessel propulsion and control are familiar with many different ways in which the trim angle of a marine drive, such as an outboard motor or stern drive, can be varied to change the handling or fuel efficiency of the vessel. For example, many manual trim control systems are known to those skilled in the art. In typical operation, the operator of a marine vessel can change the trim angle of an associated outboard motor as the velocity of the vessel changes. This is done to maintain an appropriate angle of the vessel with respect to the water as it achieves a planing speed and as it increases its velocity over the water while on plane. The operator inputs a command to change the trim angle for example by using a keypad, button, or similar input device with "trim up" and "trim down" input choices (e.g., see FIG. 4).

The systems of the present disclosure are also capable of carrying out automatic trim (auto-trim) methods, in which the marine drive is automatically trimmed up or down with respect to its current position, depending on a desired effect. As described herein, the inventors have recognized that an automatic trim program, or routine, can be devised and implemented to mimic the effects of mounting the plurality of marine drives at canted angles during a turn for a multi-hull marine vessel. Namely, the plurality of marine drives can be trimmed variably, where drives on either side of the vessel centerline VC (FIG. 1B) are trimmed oppositely from one another, to induce a desired roll behavior of the multi-hull marine vessel. Auto-trim systems perform trim operations automatically, as a function of measured vessel conditions, without requiring intervention by the operator of the marine vessel. The automatic change in trim angle of the trimmable marine drive 10 (e.g., 10a and 10d or 10a-10d) enhances the operation of the marine vessel. For example, trimming the marine drive 10 can affect a direction of thrust of a propeller with respect to a vessel transom, as well as affect vessel roll and pitch.

Figure 1B:
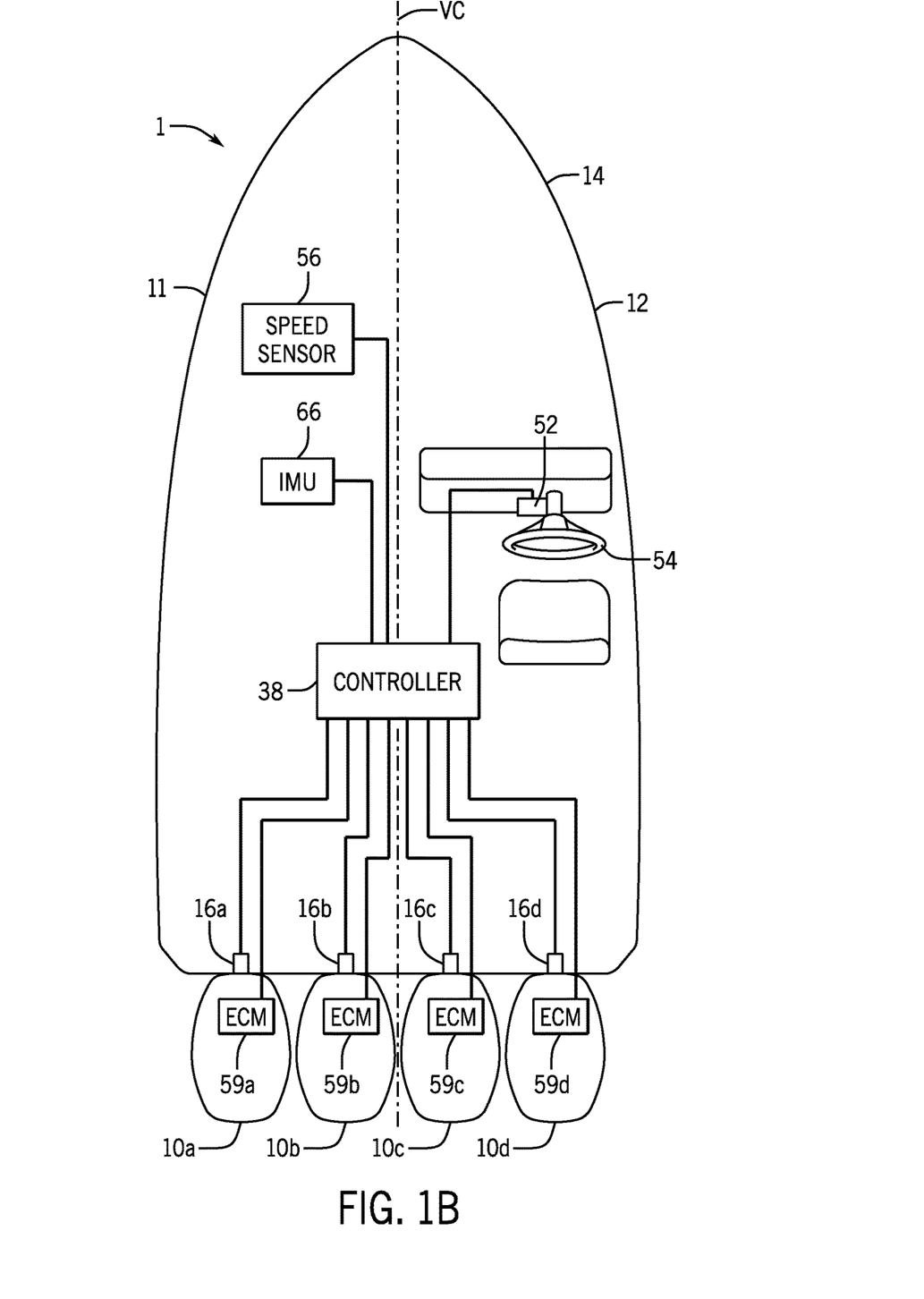
FIG. 1B is a schematic illustration of a dual-hull marine vessel having a plurality of marine drives.

FIG. 1B depicts one embodiment of a system 1 for controlling trim position of marine drives 10a-10d on a multi-hull marine vessel 14, which in the depicted embodiment include a port exterior marine drive 10a, a port interior marine drive 10b, a starboard interior marine drive 10c, and a starboard exterior marine drive 10d. While the methods and systems are described herein with respect to four marine drives 10a-10d, a person of ordinary skill in the art will understand in light of this disclosure that the disclosed methods and systems are equally applicable to marine vessels having a plurality of drives. In the example at FIG. 1A, the plurality of marine drives is exemplified as a port drive 10a and a starboard drive 10d. Likewise, though the marine drives 10a-10d are exemplified in the FIGURES as outboard motors, a person having ordinary skill in the art will understand in light of this disclosure that the marine drives may also be stern drives with trimmable lower units.

The trim position of each marine drive 10a-10d is actuated by a respective trim actuator 16a-16d. In one example, the trim actuator is a hydraulic piston-cylinder assembly in fluid communication with a hydraulic pump-motor combination, although the principles of some of the below examples could apply equally to electric linear actuators, pneumatic actuators, or other types of trim devices. The trim actuator may be actuated between an extended position and a retracted position by provision of hydraulic fluid, electrical power, pneumatic fluid, etc. The extension and retraction of the trim actuator can be used to rotate a trimmable marine drive up and down with respect to a marine vessel to which it is coupled.

As described above, the present inventors have recognized that the problems and issues relating to undesired roll behavior of multi-hull vessels during turn can be mitigated without canting the engines by executing an automated variable trim routine during the turn. For example, on a marine vessel having two or more marine drives, the trim position may be cascaded when entering a turn and throughout the turn to induce an inward roll during the vessel turn. The magnitude of the trim change may be automatically varied based on several vessel operation factors, such as vessel speed and/or turn magnitude, so as to produce an appropriate inward roll during the vessel turn. Additionally, the trim change magnitude may be calibrated to mimic a cant angle magnitude, and thus to mimic a predetermined amount of cant. In this way, a boat builder or assembler can calibrate the trim routine to achieve a desired turn behavior for the multi-hull vessel rather than mounting the marine drives at canted angles.

The plurality of marine drives are trimmed up or down based on the direction of turn, and in some embodiments based on the magnitude of the turn and the speed of the vessel 14. The drives are preferably trimmed oppositely on either side of the centerline VC such that the trim changes cancel each other out and the net trim change is zero. For example, the marine drives may be cascaded by trimming down (sometimes referred to as trimming in) the outer drive(s) to a turn and trimming up (sometimes referred to as trimming out) the inner drive(s) to the turn.

The trimming operation of each trim actuator 16a-16d is controlled by controller 38, which may equivalently be a set of controllers (such as one for each drive 10a-10d). The controller 38, is communicatively connected to each of the trim actuators 16a-16d to control activation thereof. The controller 38 controls trim of each of the marine drives 10a-10d separately by controlling the respective trim actuator 16a-16d, and such control may be provided as described herein based on one or more of engine speed, vessel speed, and/or steering information indicating that the vessel is entering a turn and/or indicating turn magnitude (such as steering wheel angle, a drive angle measured at each drive 10a-10d, a vessel roll angle, and/or a change in yaw angle of the vessel). In the depicted embodiment, the controller 38 may receive engine speed, or engine RPM, from the engine control module (ECM) 59a-59d on each of the marine drives 10a-10d. The controller 38 may receive a vessel speed from speed sensor 56 and receives a roll angle and yaw angle of the marine vessel from inertial measurement unit (IMU) 66.

The controller 38 may receive a steering wheel angle from wheel position sensor 52 on the steering wheel 54, which in the depicted embodiment is a rotational position sensor 52 detecting the rotational position of steering wheel 54. The rotational position of the steering wheel may be, for example, measured as an angle with respect to a centered position 55, which is the position of the steering wheel 54 associated with a straight-ahead steering command. A person of ordinary skill in the art will understand in light of the disclosure that the steering input device 54 may be any number of other user interface devices operable by a user to provide control inputs to steer the marine vessel, such as a joystick, trackpad, etc., and the steering position sensor 52 may be any sensor device that senses movement or input on said devices. Alternatively or additionally, the steering input may be provided by an automatic steering control system associated with the marine vessel 14, such as a heading or waypoint control system.

Alternatively or additionally, the controller 38 may receive a drive angle from a drive position sensor 63 (FIG. 4) configured to sense the angle of the marine drive with respect to the transom or the drive mount. A steering actuator 17 is configured to position the respective drive 10a-10d at an angle based on a steering command, such as from the steering wheel 54 or from an automatic steering control system. The drive position sensor 63 senses an angular position of the respective drive 10a-10d, which indicative of a turn magnitude and turn direction for the vessel 14.

Figure 2:
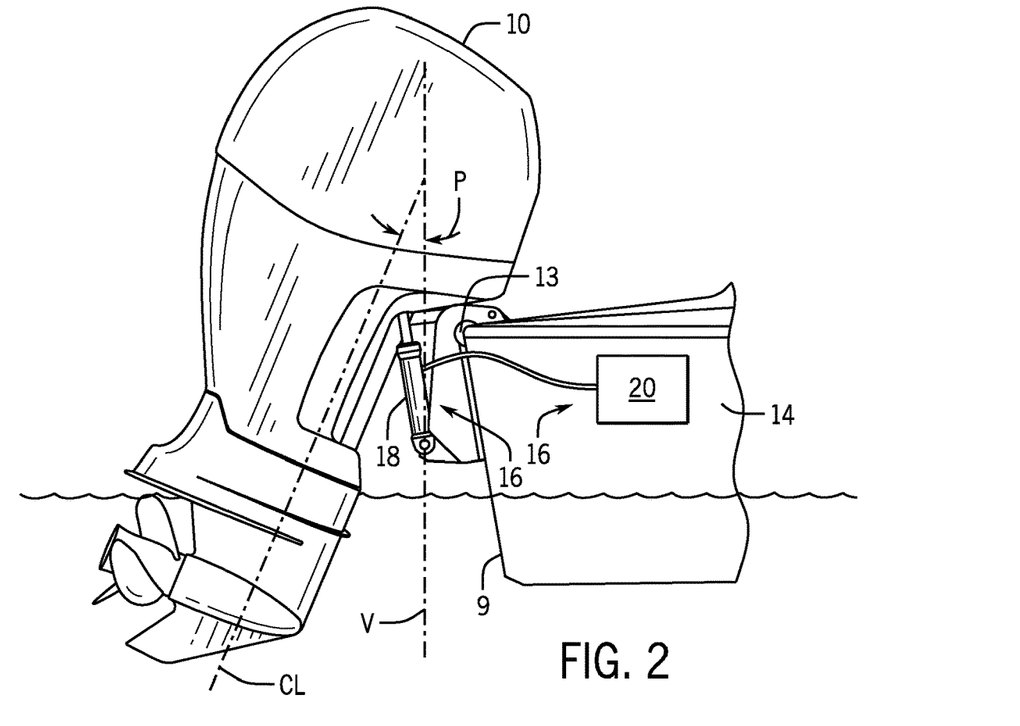
FIG. 2 depicts one embodiment of a trimmable marine drive according to the present disclosure.

Referring to FIG. 2, the position of a trimmable marine drive 10 (such as the outboard motor shown herein) with respect to the transom 9 of a marine vessel 14 is controlled by a hydraulic trim actuator 16. The trim actuator 16 includes a hydraulic piston-cylinder assembly 18 connected to a hydraulic pump-motor combination 20. The piston-cylinder assembly 18 has a first end (here, the cylinder end) coupled to the transom 9 of the vessel 14 and a second, opposite end (here, the rod end) coupled to the marine drive 10, as known to those having ordinary skill in the art. The piston-cylinder assembly 18 operates to rotate the marine drive 10 about a horizontal trim axis 13 to a trimmed up position, to a trimmed down position, or to maintain the marine drive 10 in any position there between as the pump-motor combination 20 provides hydraulic fluid to the piston-cylinder assembly 18 to move the piston within the cylinder. Other types of hydro-mechanical or electro-mechanical actuators could be used in other examples.

Figure 3:
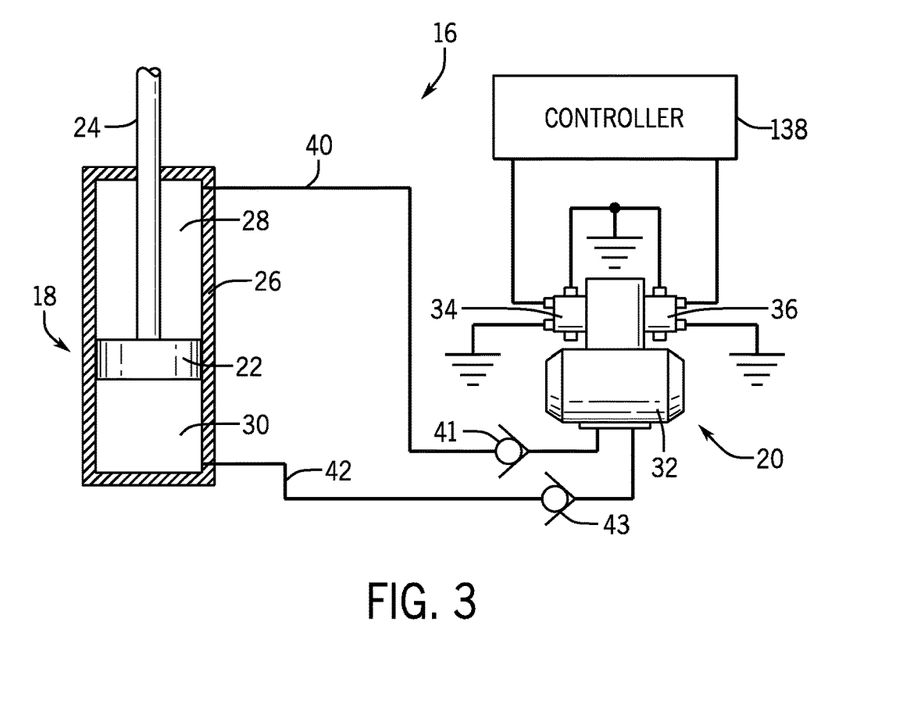
FIG. 3 is a schematic depiction of one embodiment of a trim actuator in a system for controlling trim position of marine drives.

One example of a hydraulic trim actuator 16 is shown in FIG. 3. The piston-cylinder assembly 18 is shown schematically as having a piston 22 connected to a rod 24 disposed in a cylinder 26. The piston 22 defines a first chamber 28 within the cylinder 26 and a second chamber 30 within the cylinder 26, both of which chambers 28, 30 change in size as the piston 22 moves within the cylinder 26. The pump-motor combination 20 includes a pump-motor 32 connected to a trim-in (or trim-down) relay 34 and a trim-out (or trim-up) relay 36. In other examples, the trim-in relay 34 and the trim-out relay 36 are a single relay that can turn the pump-motor 32 on or off and can effectuate a trim down or trim up movement of the trim actuator 16. The relays 34 and 36 are connected to a controller 138 that controls energizing of solenoids in the relays 34 and 36, which act as switches to couple a power source such as a battery (not shown) to chamber 28 of the piston-cylinder assembly 18, and a second hydraulic line 42 couples the pump-motor 32 to the second chamber 30 of the piston-cylinder assembly 18. The controller 138 may be communicatively connected to the controller 38 to receive a desired trim position or trim control action. As long as the trim down relay 34 is activated, the pump-motor 32 provides hydraulic fluid through the first hydraulic line 40 to the first chamber 28 of the piston-cylinder assembly 18, thereby pushing the piston 22 downwardly within the cylinder 26 and lowering (trimming in or trimming down) the marine drive 10 coupled to the rod 24. As long as the trim up relay 36 is activated, the pump-motor 32 provides hydraulic fluid through the second hydraulic line 42 to the second chamber 30 of the piston-cylinder assembly 18, thereby pushing the piston 22 upwardly within the cylinder 26 and raising (trimming out, or trimming up) the marine drive 10 coupled to the rod 24. Hydraulic fluid can be removed from the opposite chamber 28 or 30 of the cylinder 26 into which fluid is not being pumped in either instance and drained to a tank or circulated through the pump-motor 32.

In this way, the trim actuator 16 can position the marine drive 10 at different angles with respect to the transom 9. These may be a neutral (level) trim position, in which the centerline CL of the marine drive 10 is in more or less aligned with the vertical axis V; a fully trimmed down position where the drive 10 is in a full tuck and is closest to the transom 9; or a fully trimmed out position, such as where the propeller is lifted out of the water. A trimmed up position, as shown in FIG. 2, is often used when the marine vessel 14 is on plane and high speeds are required. At high speeds, the trimmed up position causes the bow of the marine vessel 14 to rise out of the water, resulting in better handling and increased fuel efficiency. Thus, many auto-trim algorithms include determining a target running trim position at which to orient the marine drive 10 with the controller 38 based on speed, such as but not limited to engine speed, vessel speed, a combination of vessel speed and engine speed, or a tradeoff between vessel speed and engine speed depending on additional vessel conditions. Examples of such systems are shown and described in U.S. Pat. No. 7,416,456; and application Ser. Nos. 14/873,803; 15/003,326; 15/003,335, which are incorporated herein by reference in their entireties.

As an example, the controller 38 may define the running trim position as a percentage between the fully trimmed down position (full tuck) and the fully trimmed up position (e.g. for trailering) or the maximum available trim position (e.g. maximum allowed trim position while the drive is operating). Alternatively, the trim position may be quantified as a value P with respect to the vertical line V (as opposed to the fully trimmed in position), which represents the angle or comparative position between the centerline CL of the marine drive 10 and the vertical line V. The trim value P may be expressed as an angle, a percentage of a total angle to which the marine drive 10 can be trimmed, a scalar value, a polar coordinate, or any other appropriate unit. For purposes of the description provided hereinbelow, the angle P will be expressed as a percentage of total allowable trim angle, which can be measured from vertical, from a fully trimmed up position, or from a fully trimmed in position. The angle P is measured by the trim position sensor 62.

Figure 4:
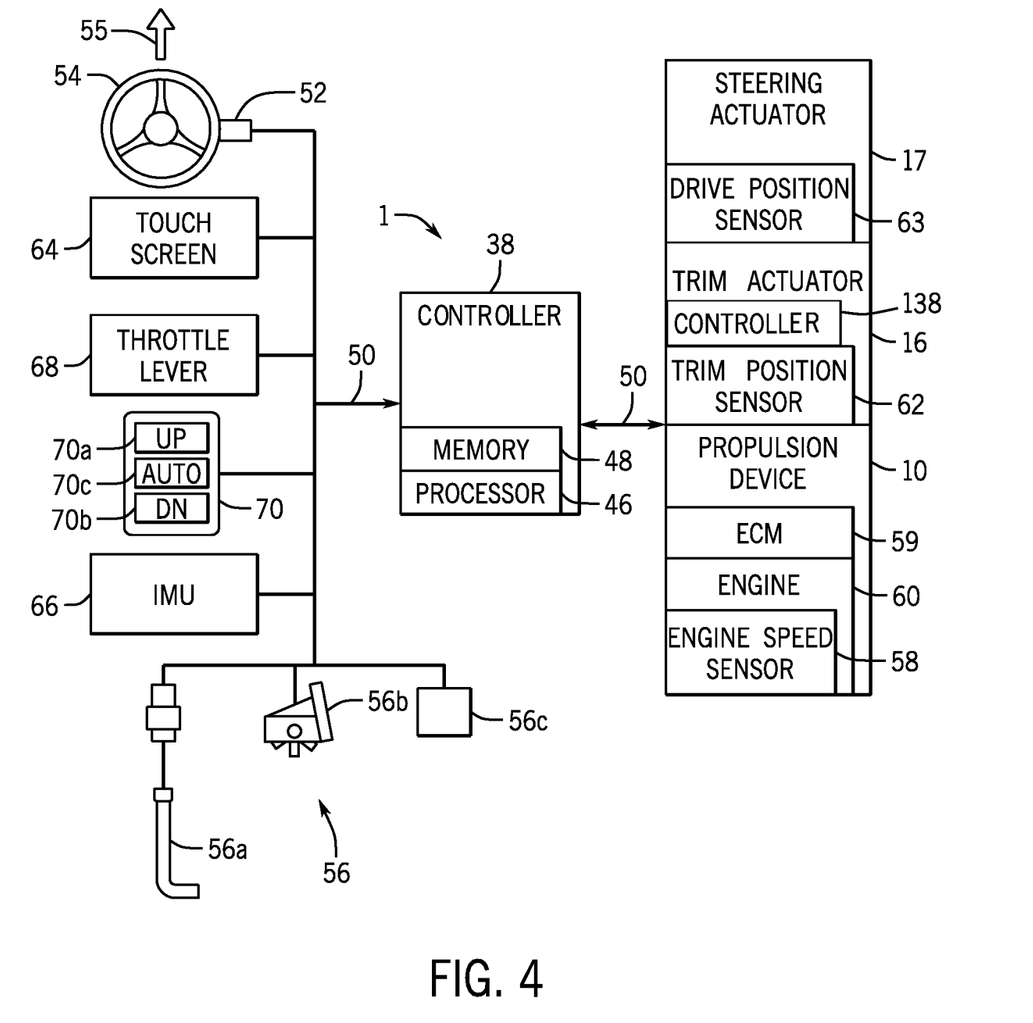
FIG. 4 is a schematic diagram depicting another embodiment of a system for controlling trim position of a marine drive according to one embodiment of the present disclosure.

FIG. 4 shows a schematic of an embodiment of the trim control system 1 for controlling trim position. In the example shown, the system 1 includes at least one controller 38, which is programmable and includes a processor 46 and a memory 48. The controller 38 can be located anywhere on the marine vessel 14 and/or located remote from the marine vessel 14 and can communicate with various components of the system 1 via wired and/or wireless communication links, as will be explained further hereinbelow. Portions of the method disclosed hereinbelow can be carried out by a single controller or by several separate controllers. Although the figures show a single controller 38, the system 1 may equivalently include more than one controller 38 that are communicatively connected. For example, the system 1 may have a controller 38 located at or near a helm (e.g., a helm control module (HCM) or a command control module (CCM)) of the marine vessel 14 and can also have one or more controllers located at or near the marine drives 10a-10d which carry out at least a portion of the trim control methods described herein. In some embodiments, the controller 38 may be a dedicated control device for executing trim control logic, or may be incorporated in and a function of a multi-function control device, such as incorporated into a helm control module (HCM), thrust vector control module (TVM), or other control device and software communicatively connected to the ECMs 59a-59d. The controller 38 may be configured to cooperate with the controller 138 on the trim actuator, such as to send control commands (e.g., a target trim position or trim change command) that are effectuated by the controller 138.

The controller 38 may be a computing system that includes a processing system 46 and a storage system 48 storing software and control values, and input/output (I/O) interfaces for communicating with devices. The processing system can comprise a microprocessor (e.g., processor 46) and other circuitry that retrieves and executes software from the storage system. Processing system can be implemented within a single processing device but can also be distributed across multiple processing devices or sub-systems that cooperate in executing program instructions. The storage system (e.g., memory 48) can comprise any storage media readable by the processing system and capable of storing software and control values, including the trim control software and values described herein.

In this example, the control devices in the control system 1 communicate with one or more other components in the system 1 by sending and/or receiving signals via a communication link 50, which can be a wired or wireless link. In one example, the communication link 50 is a controller area network (CAN) bus, but other types of links could be used. It should be noted that the extent of connections of the communication link 50 shown herein is for schematic purposes only, and the communication link 50 in fact provides communication between the controller 38 and each of the sensors, devices, etc. described herein, although not every connection is shown in the drawing for purposes of clarity.

As mentioned, the controller 38 receives inputs from several different sensors and/or input devices aboard or coupled to the marine vessel 14. For example, the controller 38 receives a steering input from a steering position sensor 52 that senses a position or angle of a steering input device, such as a joystick and/or a steering wheel 54. As described above, the steering input may also be provided by an automatic steering control system. The controller 38 may also be provided with an input from a vessel speed sensor 56. The vessel speed sensor 56 may be, for example, pressure-type sensor, such as pitot tube 56a, a paddle wheel type sensor 56b, or any other speed sensor appropriate for sensing the actual speed of the marine vessel. Alternatively or additionally, the vessel speed may instead be determined based on readings from a GPS device 56c, which calculates speed by determining how far the vessel 14 has traveled in a given amount of time. The marine drive 10 may also be provided with an engine speed sensor 58, such as but not limited to a tachometer, that determines a speed of the engine 60 powering the marine drive 10 in rotations per minute (RPM). The engine speed can be used along with other measured or known values to approximate a vessel speed (i.e., to calculate a pseudo vessel speed).

A trim position sensor 62 is also be provided for sensing an actual position of the trim actuator 16, for example, by measuring a relative position between two parts associated with the trim actuator 16. The trim position sensor 62 may be any type of sensor known to those having ordinary skill in the art, for example a Hall effect sensor or a potentiometer, such as examples provided and described in U.S. Pat. No. 6,322,404 incorporated herein by reference. The controller 38 may also receive inputs from an IMU 66 that senses a roll position, yaw position, and pitch of the multi-hull vessel 14. For example, the IMU 66 may comprise a gyroscope, such as a three-axis gyroscope, to detect orientation information that may be used to determine the roll, yaw, and pitch angles of the marine vessel 14. In other embodiments, the IMU 66 may be a magnetometer, or may include any other type of position or inertial measurement unit, such as a combination accelerometer and/or gyroscope with a magnetometer.

Other inputs to the system 1 can come from operator input devices such as a throttle lever 68, a keypad 70, and a touchscreen 64. The throttle lever 68 allows the operator of the marine vessel to choose to operate the vessel in neutral, forward, or reverse, as is known. The keypad 70 can be used to initiate or exit any number of control or operation modes (such as auto-trim mode), or to make selections while operating within one of the selected modes. In one example, the keypad 70 comprises an interface having a "trim up" button 70a, a "trim down" button 70b, and an "auto-trim on/resume" button 70c, which can be utilized by a user to control the running trim position of one or more of the marine drives 10a-10d. For example, the trim buttons 70a and 70b may provide user input to control all of the marine drives to the same running trim position. The touchscreen 64 can also be used to initiate or exit any number of control or operation modes (such as trim up, trim down, or auto-trim mode), and in that case the inputs can be buttons in the traditional sense or selectable screen icons. The touchscreen 64 can also display information about the system 1 to the operator of the vessel 14, such as engine speed, vessel speed, trim angle, trim operating mode, vessel acceleration rate, etc. Additionally, the touchscreen 64 may replace the keypad 70, providing the trim buttons 70a-70c.

As described above, the present inventor has recognized trim of the marine drives 10 on a marine vessel can be automatically controlled to discreetly control the two or more marine drives (e.g., 10a-10d) to different trim angles during a turn such that the outer drive(s) to a turn (on the outer side of the turn) are trimmed down from the running trim position and the inner drives to the turn (on the inner side of the turn) are trimmed up from the running trim position. After completion of the turn, or as the vessel is coming out of the turn, the drives are returned to the running trim position.

Figure 5:
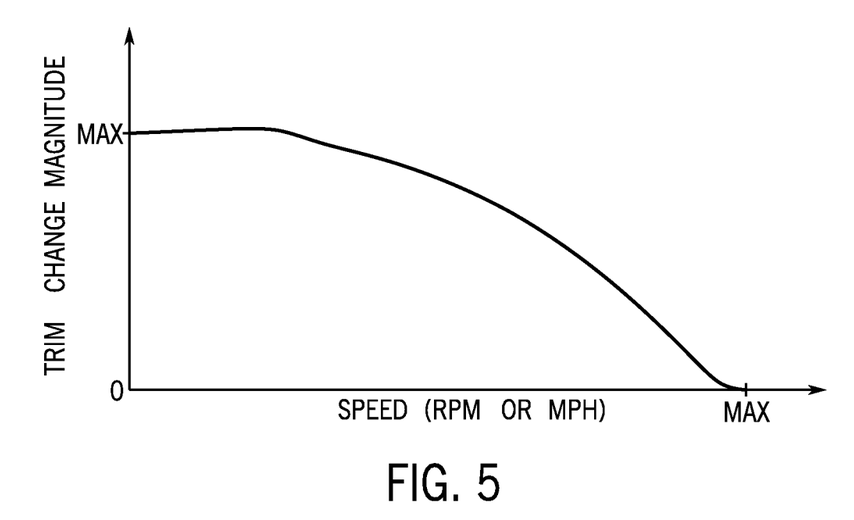
FIG. 5 exemplifies a relationship between speed, such as vessel speed or engine speed, and trim change magnitude.

FIG. 5 is a graphical representation demonstrating an exemplary relationship between trim change magnitude and speed, such as vessel speed or engine speed. A maximum trim change is effectuated at low speeds, and as the speed increases the change in trim decreases to avoid destabilizing the vessel at high speeds. At or near the maximum vessel speed, for example, the trim change effectuated during a turn may be zero.

Figure 6:
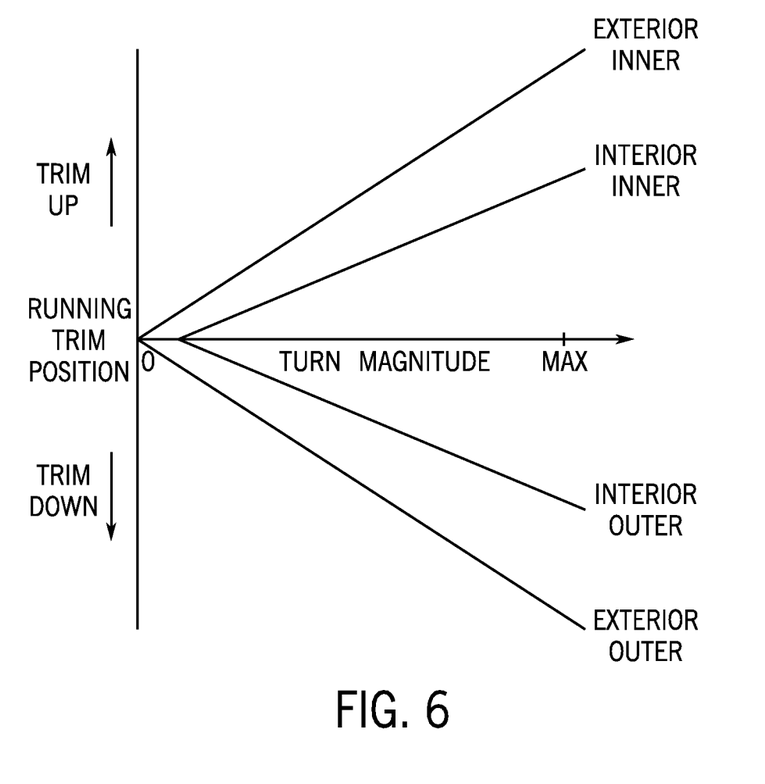
FIG. 6 exemplifies a relationship between turn magnitude and trim position for four marine drives.

FIG. 6 is a graphical representation of an exemplary relationship between trim change and turn magnitude. As described above, turn magnitude indicates the degree or angle of vessel turn and may be determined or indicated by the steering wheel angle, drive angle of the marine drive, roll angle of the marine vessel, or a change in yaw angle of the multi-hull marine vessel 14. The change in roll angle will be opposite that of a mono-hull vessel because, as described above, multi-hull vessels tend to rotate outward away from the turn. Thus, the detected roll angle indicating that the vessel is entering a turn may be an outward change in roll indicating the initiation of a vessel turn. In certain embodiments, it may be preferable to detect that the marine vessel is entering a turn based on steering wheel angle or drive angle, as those values may be used to detect a turn earlier than the change in yaw position or roll angle. In any such embodiment, the greater the steering information value, the greater the turn magnitude. For example, the greater the steering wheel angle from centered positioned, or dead ahead, the greater the turn magnitude. Likewise, the greater the drive angles from the centered drive position (dead ahead), the greater the turn magnitude. Likewise the greater the change in yaw angle or greater the roll angle from horizontal, the greater the turn magnitude.

The trim position is determined for each marine drive based on the turn magnitude so as to properly induce roll of the multi-hull vessel into the turn based on the degree that the vessel is being turned. In certain embodiments, turn detection, or detecting that the marine vessel is entering a turn, may be based on a different set of steering information, or different values than the determination of trim change magnitude. For instance, the controller may be configured to detect that the multi-hull marine vessel is entering a turn based on steering wheel angle or drive angle, and may then be configured to control the trim change magnitude based on change in yaw angle and/or roll angle in order to properly control vessel roll. To provide just one example, the sensed roll angle may be used as feedback control for controlling the trim change magnitude so that a predefined amount of inward roll is generated based on the turn magnitude, which may be determined based on steering values or based on the change in yaw.

In embodiments where a plurality of marine drives includes four or more marine drives, the marine drives on either side of the centerline VC are changed in the same direction, but may be changed by different trim change magnitudes. FIG. 6 depicts an example involving four marine drives. In a turn, two of the marine drives will be inner to the turn (on the inside of the turn) and two marine drives will be outer turn (on the outside of the turn). Thus, the four marine drives may be defined based on the turn direction (i.e. starboard direction toward the starboard side 12 or port direction toward the port side 11) as one of an exterior inner drive, an interior inner drive, an interior outer drive, and an exterior outer drive. The exterior inner drive and exterior outer drive may be changed by the largest trim change magnitudes, which in certain preferred embodiments are equidistance from the running trim position. The interior inner and interior outer drives are changed by a second trim change magnitude which is less than the first trim change magnitude effectuated for the exterior drive. Thus, for any given turn magnitude, two trim or more change magnitudes may be defined, such as one for the interior drives and one for the exterior drives. Then the inner marine drives are trimmed up by the respective trim change magnitudes and the outer marine drives are trimmed down by the respective trim change magnitudes. In embodiments with an odd number of drives, where one drive is mounted on the centerline VC of the vessel 14, the trim position of that center drive may remain unchanged.

As the turn magnitude increases or decreases while the turn is underway, the trim position of all four marine drives may be adjusted accordingly to either move the drives away from the running position while the turn magnitude is increasing or move the drives back toward the running trim position as the turn magnitude decreases, such as at the end of a turn. Thereby, the marine drives are cascaded away from the running trim position at the beginning of the turn and back toward the running trim position as the turn is completed.

In certain embodiments, the marine drives may be at different trim rates of change based on the trim change magnitude assigned for the respective drive. Thus, for the exterior drives where the trim change magnitude is larger, they may be moved at a faster trim rate of change than the interior drives. This varying trim rate of change may be effectuated so that the exterior drives and the interior drives reach their target trim position at the same time. Controllers for variable trim rates of change are known, such as described in U.S. Pat. No. 9,862,471, which is incorporated herein by reference in its entirety.

In certain embodiments, the trim change magnitude may be configured to mimic an effect of mounting the plurality of marine drives at specified, or predetermined, cant angles. For example, the trim change magnitudes may be determined and configured such that they induce the same amount of vessel roll, for example, at the range of turn magnitude and speed as mounting the marine drive at a particular cant angle, such as at 5 degrees of cant or 10 degrees of cant for instance. Thereby, a boat builder or manufacturer may be enabled to select a degree of cant that they might have ordinarily used for mounting the drives when configuring the auto trim system. They can then mount the drive vertically and expect that the auto trim programming will mimic the effect of mounting the drive at the specified cant angles during vessel turn so as to induce the desired roll behavior during vessel turn that would otherwise have been achieved by mounting the marine drive at canted angles. For example, a plurality of trim behavior profiles may be available within the system for each of a list of predefined cant angles and may be selectable during configuration of the auto trim system. For instance, each of the selectable trim profiles may be associated with a lookup table or other set of trim commands that effectuate trim change magnitudes based on the selected predefined cant angle.

To provide just one example, the trim change magnitude (s) may be determined using a lookup table of calibrated trim change magnitudes for the respective number of drive positions (e.g. exterior and interior). In one example, the lookup table may provide trim change magnitudes based on speed and/or based on any turn magnitude value, such as steering wheel angle or drive angle. In one embodiment, the look up table may be a three-dimensional table providing calibrated trim change magnitudes based on both speed and turn magnitude. The turn change magnitudes are then effectuated based on the running trim position. In certain embodiments, the trim change magnitude may also account for the marine trim position. To provide just one example, the trim change magnitude could be a multiplier, such as a percentage, of the running trim position. Alternatively, a multiplier may be associated with each running trim position, and the trim change magnitude, such as determined based on the above-described look up table, may be multiplied by the running trim position multiplier in order to arrive at the final trim change magnitude that gets implemented by the controller.

Figure 7:
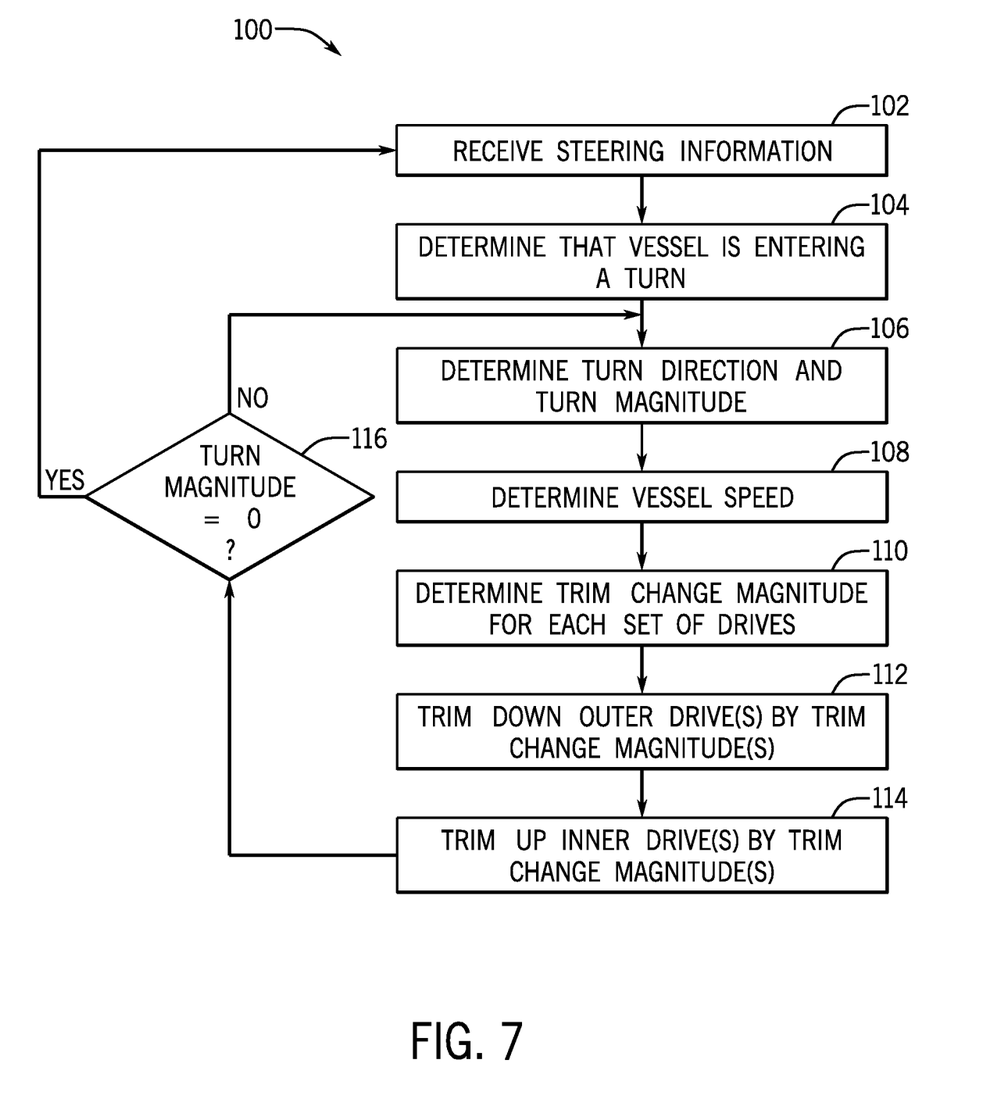
FIG. 7 depicts one embodiment of a method for controlling trim position of a plurality of marine drives in accordance with one embodiment of the disclosure.

FIG. 7 depicts one embodiment of a method 100 for controlling trim position of a plurality of marine drives in accordance with one embodiment of the disclosure. Steering information is received at step 102, such as steering wheel angle, drive angle of each of the plurality of marine drives, a change in yaw angle or a vessel roll angle of the multi-hull marine vessel. Instructions are then executed to detect when the marine vessel is entering the turn. For example, the controller may be configured to determine that the vessel is entering a turn when a threshold steering information value is detected, such as a threshold steering wheel angle, a threshold drive angle at each of the marine drives, a threshold change in yaw position, or a threshold roll angle (which again is an outward roll from the direction of turn).

Once it is determined that the marine vessel is entering a turn, as represented at step 104, the controller determines a turn direction and a turn magnitude at step 106. For example, the turn direction is one of a starboard direction or a yaw direction based on steering information, such as based on the steering wheel angle or steering angle of the drive, etc. The turn magnitude is also determined based on the steering information, and generally correlates with the magnitude of the steering information value, examples of which are described herein. In certain embodiments, different steering information values may be utilized for determining whether the vessel is entering a turn and for determining steering direction and/or turn magnitude.

A vessel speed is determined at step 108. Trim change magnitude is then determined for each of the set of marine drives based on the vessel speed and the turn direction. For example, the trim change magnitude may be determined at step 110 by utilizing a lookup table to locate the trim change magnitude based on the vessel speed and the turn magnitude. The trim change magnitude is then implemented in order to trim down the outer drives by the trim change magnitude at step 112 and trim up the inner drives by the trim change magnitude at step 114, wherein steps 112 and 114 are executed simultaneously. In certain embodiments, the marine drives may be moved at different trim rates of change, such as where the exterior drives are moved more quickly than the interior drives such that the exterior drives and the interior drives reach the desired trim positions based on the respective trim change magnitudes at the same time.

The trim positions may be continuously controlled based on the turn magnitude and vessel speed in order to gradually increase and decrease speed during turns. Once the turn magnitude reaches zero at step 116, which is to say the marine vessel is traveling straight ahead, then the controller ends the trim routine for inducing roll during trim and returns to step 102 where it continually monitors steering information to detect whether the vessel is entering another turn.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method of controlling a plurality marine drives on a multi-hull marine vessel, the method comprising:
   determining based on steering information that the multi-hull marine vessel is entering a turn;
   receiving a running trim position for each marine drive; and
   inducing roll of the multi-hull marine vessel during the turn by adjusting a trim position of at least a portion of the plurality of marine drives from each respective running trim position.

2. The method of claim 1, wherein the trim position adjustment includes trimming down at least one of the plurality of marine drives from its running trim position and trimming up a different at least one of the plurality of marine drives from its running trim position to mimic an effect of mounting the plurality of marine drives at canted angles on the multi-hull marine vessel.

3. The method of claim 1, further comprising:
   determining a turn direction;
   identifying at least one outer drive to the turn and at least one inner drive to the turn based on the turn direction; and
   wherein adjusting the trim position of the plurality of marine drives includes trimming down the at least one outer drive to the turn from its running trim position and trimming up the at least one inner drive to the turn from its running trim position.

4. The method of claim 3, wherein adjusting the trim position of the plurality of marine drives includes trimming down the outer drive to the turn by a trim change magnitude and trimming up the inner drive to the turn by the trim change magnitude.

5. The method of claim 4, further comprising determining the trim change magnitude based on at least one of a vessel speed and a turn magnitude.

6. The method of claim 5, further comprising calibrating the trim change magnitude to mimic a roll effect during turn produced by mounting the plurality of drives at a predefined cant angle magnitude.

7. The method of claim 5, wherein the trim change magnitude varies inversely with vessel speed such that the trim change magnitude decreases as the vessel speed increases.

8. The method of claim 5, wherein the trim change magnitude increases as the turn magnitude increases between a zero turn and a maximum turn magnitude.

9. The method of claim 5, wherein turn magnitude is determined based on at least one of a steering wheel angle, a drive angle of each of the plurality of marine drives, a change in yaw angle of the multi-hull marine vessel, and a roll angle of the multi-hull marine vessel.

10. The method of claim 1, wherein the plurality of marine drives includes at least four drives, and wherein adjusting the trim position of the plurality of marine drives includes trimming down the two outer drives to the turn and trimming up the two inner drives to the turn.

11. The method of claim 10, wherein the at least four marine drives include including two exterior drives mounted at a first distance from a centerline of the multi-hull marine vessel and two interior drives mounted at a second distance from a centerline of the multi-hull marine vessel, wherein adjusting the trim position of the plurality of marine drives includes trimming down the exterior outer drive to the turn by a first trim change magnitude, trimming down the interior outer drive to the turn by a second trim change magnitude, trimming up the exterior inner drive to the turn by the first trim change magnitude, and trimming up the interior inner drive to the turn by the second trim change magnitude, where the first trim change magnitude is larger than the second trim change magnitude.

12. The method of claim 11, wherein adjusting the trim position of the plurality of marine drives includes trimming the exterior drives at a first trim rate of change and trimming the inner drives at a second trim rate of change, wherein the first trim rate of change is larger than the second trim rate of change.

13. The method of claim 1, wherein the steering information includes at least one of a steering wheel angle, a drive angle measured at each of the plurality of marine drives, a change in yaw angle of the multi-hull marine vessel, or a roll angle of the multi-hull marine vessel.

14. The method of claim 13, wherein determining that the multi-hull marine vessel is entering a turn includes detecting at least one of a threshold steering wheel angle, a threshold drive angle at each of the marine drives.

15. A system for controlling trim position of a plurality of marine drives, the system comprising:
    a plurality of trim actuators, including at least one trim actuator for each of the plurality of marine drives;
    a control system configured to:
      receive steering information;
      determine based on the steering information that the multi-hull marine vessel is entering a turn;
      determine a turn direction;
      identify at least one outer drive to the turn and at least one inner drive to the turn based on the turn direction;
      receive a running trim position for each marine drive; and
      control the plurality of trim actuators to trim down the at least one outer drive to the turn and trim up at least one inner drive to the turn so as to induce roll of the multi-hull marine vessel during the turn.

16. The system of claim 15, wherein the control system is configured to adjust the at least one outer drive and the at least one inner drive to the turn by a calibrated trim change magnitude so as to mimic an effect of mounting the plurality of marine drives at canted angles on the multi-hull marine vessel.

17. The system of claim 15, wherein adjusting the trim position of the plurality of marine drives includes trimming down at least one outer drive to the turn by a trim change magnitude from the running trim position and trimming up at least one inner drive to the turn by the trim change magnitude from the running trim position.

18. The system of claim 17, wherein the control system is further configured to determine the trim change magnitude based on at least one of a vessel speed and a turn magnitude.

19. The system of claim 18, wherein the trim change magnitude varies inversely with vessel speed such that the trim change magnitude decreases as the vessel speed increases, and wherein the trim change magnitude increases as the turn magnitude increases between a zero turn and a maximum turn magnitude.

20. The system of claim 18, wherein the control system is further configured to determine the turn magnitude based on at least one of a steering wheel angle, a drive angle of each of the plurality of marine drives, and a roll angle of the multi-hull marine vessel.

21. The system of claim 15, wherein the steering information includes at least one of a steering wheel angle, a drive angle measured at each of the plurality of marine drives, a change in yaw angle of the multi-hull marine vessel, or a roll angle of the multi-hull marine vessel.

* * * * *